Nov. 8, 1927.
A. J. FRANCIS
SWEEP
Filed Feb. 23, 1927
1,648,843
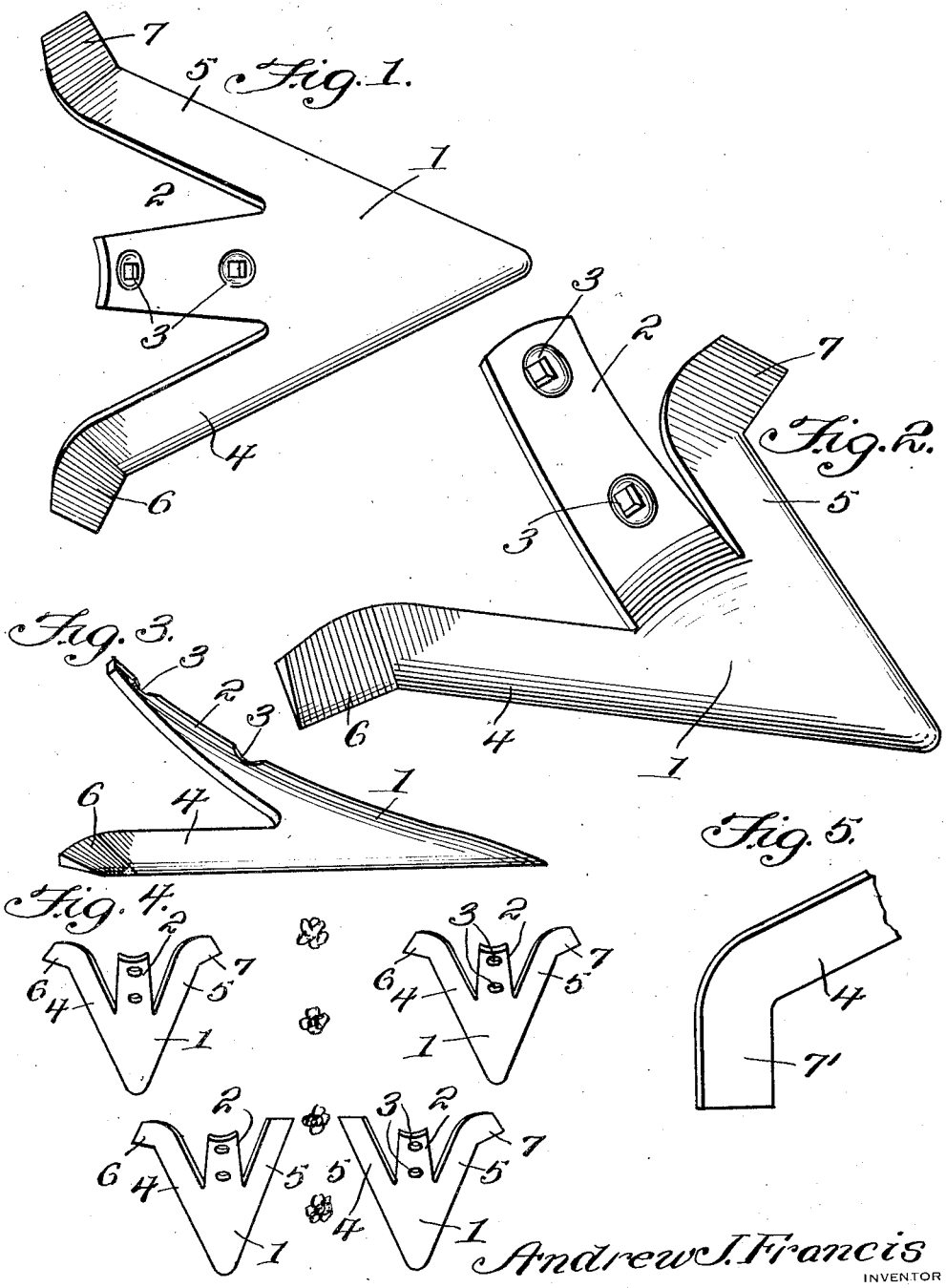

Patented Nov. 8, 1927.

1,648,843

UNITED STATES PATENT OFFICE.

ANDREW JACKSON FRANCIS, OF GEORGE WEST, TEXAS.

SWEEP.

Application filed February 23, 1927. Serial No. 170,329.

This invention relates to improvements in ground working implements and its general object is to provide a tooth in the nature of a sweep for lister cultivators and the like that includes wings formed thereon in a manner whereby weeds and other like vegetation in the path of the sweep cannot be passed thereby without being cut by the wings.

A further object of the invention is to provide a cultivator tooth in the form of a sweep that is extremely effective in its operation of cultivating crops, and in the destruction of weeds and grass with the result that the expeditious growth of the crops cultivated thereby will be assured.

Another object of the invention is to provide a cultivator sweep that is constructed to prevent the accumulation thereon of plowed up and severed weeds, grass and other matter, and said sweep is simple in construction and is inexpensive to manufacture.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a top plan view of the sweep forming the subject matter of the present invention.

Figure 2 is a perspective view of the sweep.

Figure 3 is a side elevation thereof.

Figure 4 is a diagrammatic view showing a proposed arrangement of a plurality of sweeps secured to a cultivator and their position with respect to a row of growing crop.

Figure 5 is a slightly modified form of wing.

Referring to the drawings in detail it will be noted that the tooth or sweep which forms the subject matter of the present invention is constructed from a single piece of metal, and its body which is indicated by the reference numeral 1 is of the usual V-shaped configuration with an attaching tongue 2 slightly curved upwardly from the body and provided with aligned openings 3 to accommodate bolts (not shown) for securing the sweep to a cultivator. The body from its apex is curved transversely and extending rearwardly from said body upon opposite sides of the tongue 2 are parallel arranged wings 4 and 5 which have their lower edges arranged in the same plane with the side edges of the body as best shown in Figure 3 of the drawings, and their lower edges are beveled to a cutting edge for a purpose which is apparent.

The free ends of the wings 4 and 5 are bent outwardly at a rearward inclination in the preferred form to provide cutting blades 6 and 7 and said cutting blades have their front edge beveled to the same degree as the side edges of the wing and body.

In Figure 5 I have shown a slightly modified form of cutting blade which is indicated by the reference numeral 7 and in this form the blades extend in parallelism and at right angles to the tongue 2, and are also beveled.

It will be noted from Figure 4 of the drawings that the sweeps are also to be formed with cutting blades on one of their wings only and this is preferred when the sweeps are arranged in group formation and disposed adjacent a row of growing crop.

From the above description and disclosure of the drawings, it will be obvious that I have provided a sweep formed with outwardly inclined wings and cutting blades formed on their outer ends for cutting and destroying weeds, grass and like vegetation that is a detriment to growing crops, and by inclining the cutting blades as shown in Figures 1 to 3, it will be apparent that all crop destructive vegetation arranged in the path of the sweep will be severed and thereby destroyed.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A sweep of the character described comprising a body of V-shaped configuration, an attaching tongue integrally formed with and centrally rising from said body at an inclination therefrom, wings formed with said body and extending therefrom at an inclination at opposite sides of the tongue, said body being curved transversely and formed with beveled lower edges, beveled lower edges formed on the wings and arranged in a plane with the edges of the body, cutting blades formed on the outer ends of said wings at an angle thereto and disposed at an outward inclination therefrom.

In testimony whereof I affix my signature.

ANDREW JACKSON FRANCIS.